United States Patent [19]

Campbell

[11] Patent Number: 4,722,185

[45] Date of Patent: Feb. 2, 1988

[54] DOUBLE PISTON ROCKET ENGINE ASSEMBLY

[75] Inventor: Richard G. Campbell, Thousand Oaks, Calif.

[73] Assignee: Rockwell International Corporation, El Segundo, Calif.

[21] Appl. No.: 773,902

[22] Filed: Sep. 9, 1985

[51] Int. Cl.$^4$ ............ F02K 5/02; F02K 7/00; F02K 9/00

[52] U.S. Cl. ................................ 60/247; 60/258; 60/259; 60/39.79

[58] Field of Search ........... 60/247, 248, 249, 258, 60/259, 39.48, 39.79, 39.8; 239/87

[56] References Cited

U.S. PATENT DOCUMENTS

| | | | |
|---|---|---|---|
| 2,918,791 | 12/1959 | Greiner | 60/39.48 |
| 2,995,008 | 8/1961 | Fox | 60/259 |
| 3,048,969 | 8/1962 | Horner | 60/247 |
| 3,074,231 | 1/1963 | Klein | 60/258 |
| 3,088,406 | 5/1963 | Horner | 60/247 |
| 3,479,818 | 11/1969 | Strobl | 60/39.48 |
| 4,258,546 | 3/1981 | Stratton | 60/259 |
| 4,326,377 | 4/1982 | Jaqua | 60/258 |

*Primary Examiner*—Louis J. Casaregola
*Assistant Examiner*—Donald E. Stout
*Attorney, Agent, or Firm*—H. Fredrick Hamann; Harry B. Field; Clark E. DeLarvin

[57] ABSTRACT

A compact pulse-rocket engine assembly comprising an elongated housing containing an axially extending substantially cylindrical combustion chamber terminating in a nozzle means at one end. An opposite end of the housing contains a pair of angularly disposed charging chambers. Intermediate the charging chambers and the combustion chamber are a pair of angularly disposed piston valve means. The arrangement of the valve means provides for the injection of propellants into the combustion chamber for impingement at the same point throughout the operation of the piston valve means.

8 Claims, 3 Drawing Figures

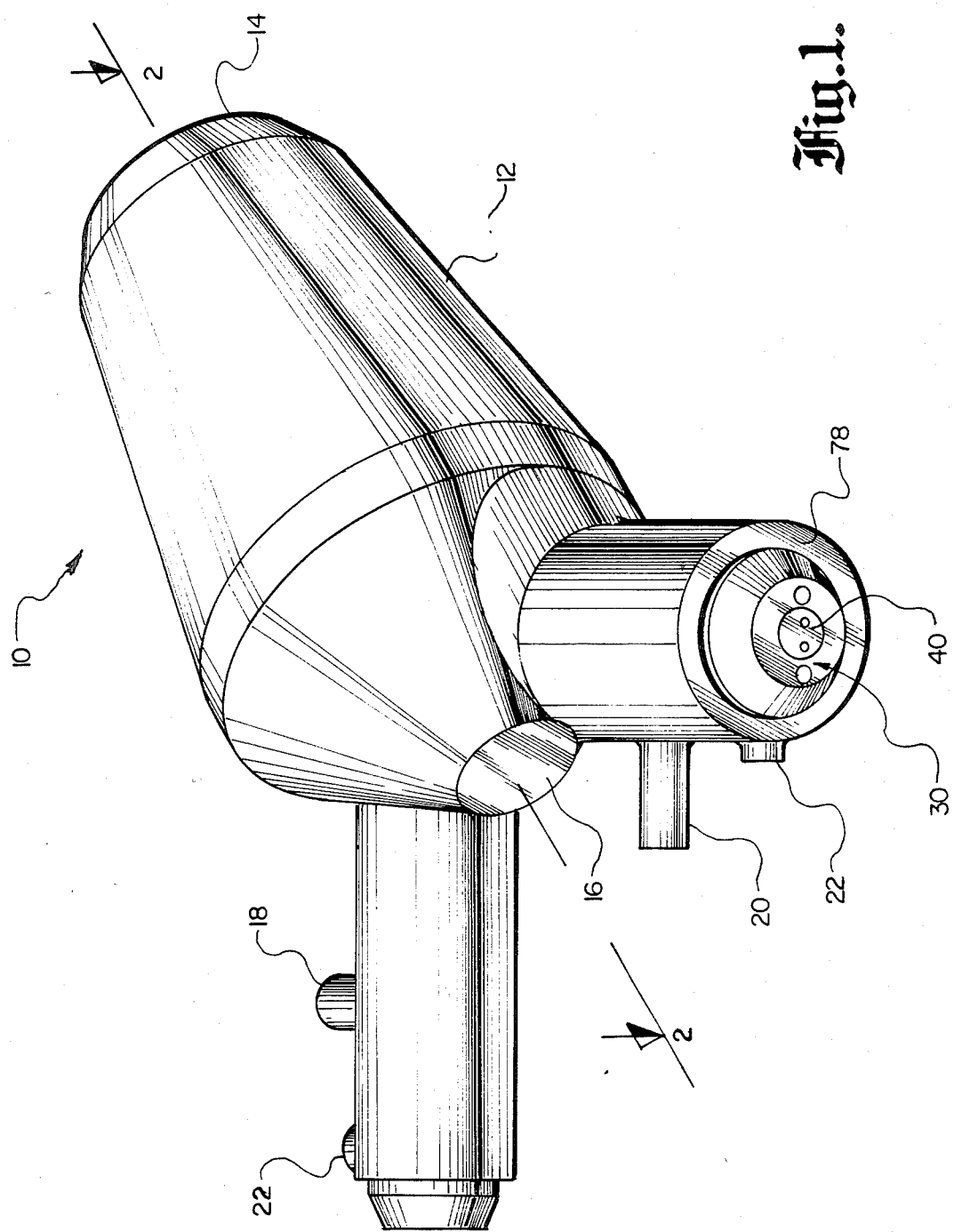

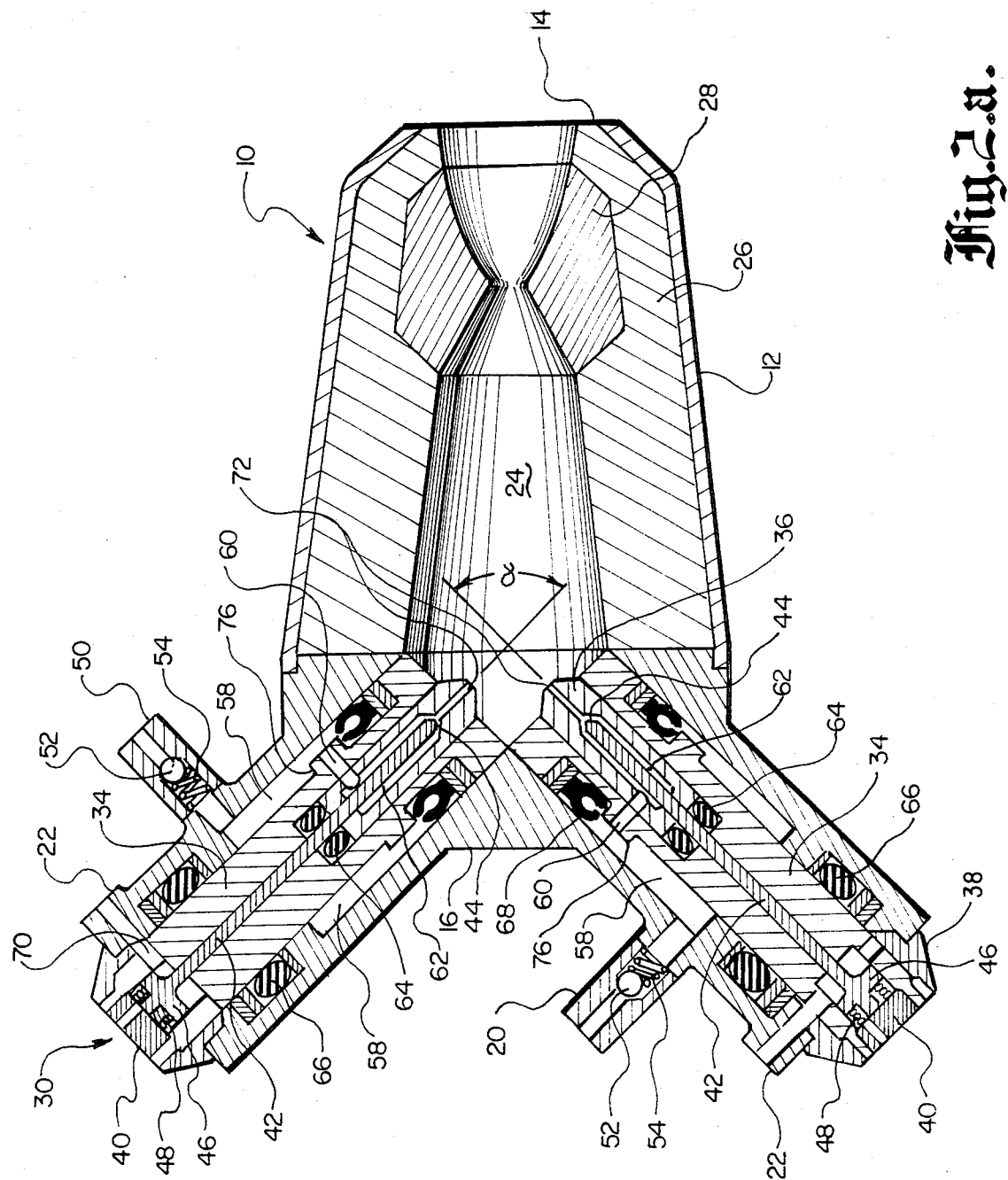

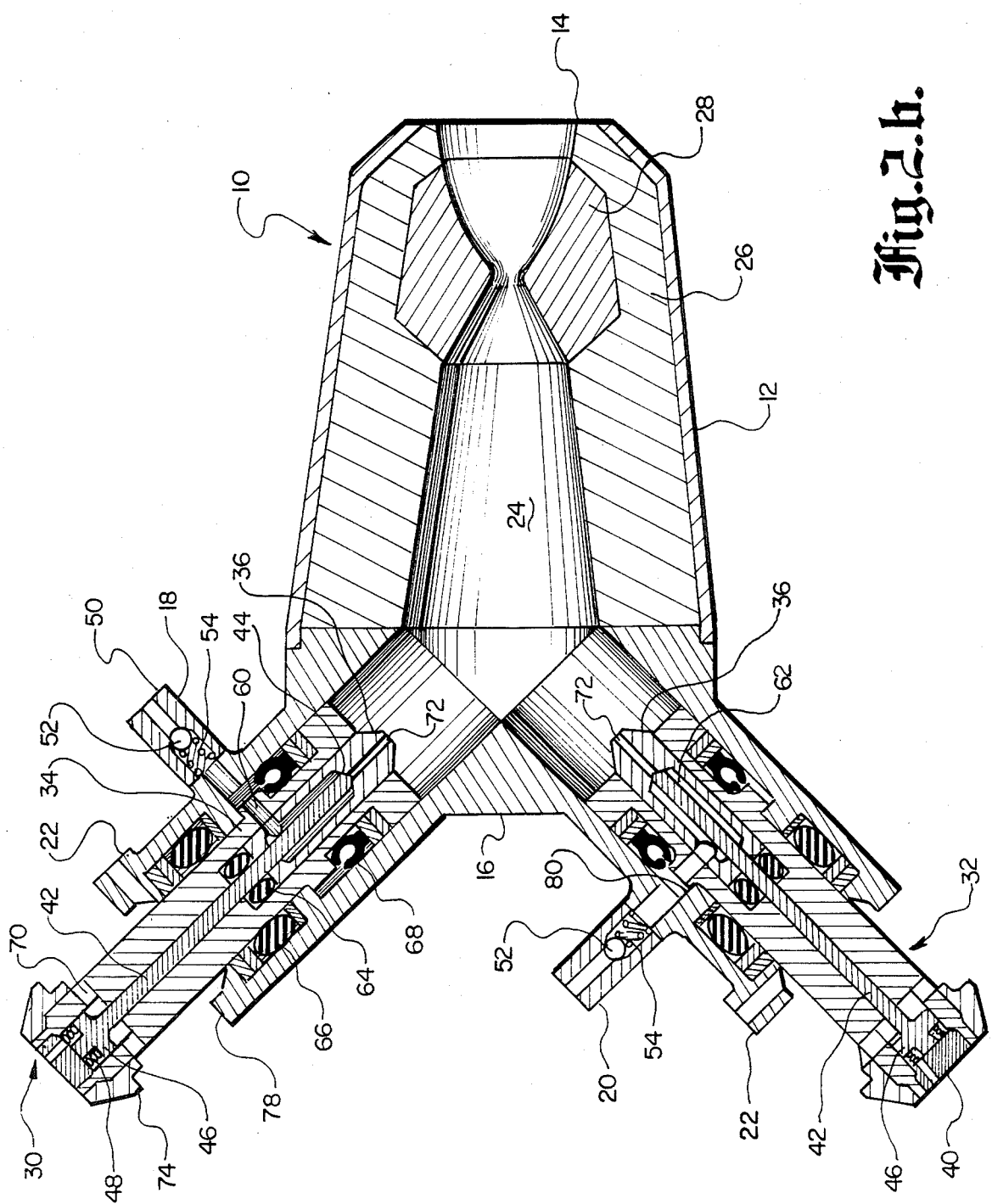

DOUBLE PISTON ROCKET ENGINE ASSEMBLY

BACKGROUND OF THE INVENTION

1. Field of the Invention

The present invention broadly relates to compact pulse-firing rocket engine assemblies. More particularly, the invention relates to such an engine which utilizes a pair of angularly disposed piston valves. The present invention is particularly adapted for spin stabilization and guidance of small vehicles.

2. Description of the Prior Art

Both liquid and solid fuel rocket engines have been known for many years. The liquid or fluid fueled rocket engines have provided the primary propulsion systems for virtually all of the world's exploration of space. Indeed, in most programs which require high performance and low weight, the liquid or fluid fueled rockets have been preferred over the solid rockets. A particular advantage of liquid rockets is that they may be started and stopped substantially as desired, whereas solid rockets are traditionally "one-shot" devices. A disadvantage of the liquid rockets, however, is that they are inherently more complex than solid rockets. The complexity of the liquid rockets is a result of the requirement for some means of providing propellants at pressure such as by pressurization of the storage tanks, a positive expulsion mechanism, pumps or the like. In addition, the liquid fueled rockets require sophisticated valves and elaborate plumbing for delivery of the fuel and regulation of its flow. Obviously, these factors add to the weight and bulk of the liquid rocket propulsion systems.

In addition to the main propulsion engines which are used to launch vehicles, there is a need for smaller reaction or rocket engines which are capable of intermittent firing for vehicle attitude adjustment, course changes, stabilization and the like. An example of an engine for such applications, is described in U.S. Pat. No. 3,479,818. The patent discloses an apparatus and method for feeding pulsating fluid propellant rocket engines. The method utilizes an energy-operated pump and an elastic storing member such as a spring. The method comprises storing pump operating energy by using the operating pressure of the rocket engine during each high pressure phase of operation and utilizing the stored energy during the low pressure phase of operation to drive the energy-operated pump and to direct the propellant into the combustion chamber so that the cycle is repeated. A disadvantage of this apparatus and method is that it utilizes a spring-operated pump device which is not only heavy, but lacks a rapid pulse response time. Further, the apparatus chamber pressure is limited by the spring utilized.

More recently, there has been suggested in U.S. Pat. No. 4,258,546 a rocket propulsion system which utilizes vehicles' spin forces to charge a specific amount of propellant through a differential area piston to create high chamber pressure. A disadvantage of this system, however, is that it utilizes a plurality of valves adding to its weight and complexity and more importantly, is not amenable to scaling down to small sizes. Accordingly, there exists a need for a small, compact engine suitable for use with, for example, a so-called kinetic energy weapon. Typically such weapons will require not more than 10 to 20 pounds of thrust for pulse durations of a few milliseconds to provide the desired spin stabilization, course correction, or both.

SUMMARY OF THE INVENTION

The disadvantages of the prior art are overcome with the present invention and a pulse rocket engine assembly is provided which is compact, reliable, light in weight and amenable to scaling down to small sizes, for example, to provide thrust in the 10 to 20 pounds force range. In addition, the assembly of the present invention is useful with propellants which are either hypergolic or which require an igniter. Accordingly, it will be seen that the rocket engine assembly of the present invention is particularly suitable and uniquely adaptable for spin stabilization and course correction of small vehicles such as kinetic energy devices.

The present invention provides a compact pulse-rocket engine assembly which is contained within an elongated substantially cylindrical housing. The housing contains and defines an axially extending substantially cylindrical combustion chamber and includes a nozzle means also located within the housing and in fluid communication with and adjacent to an end of the combustion chamber. The housing also contains a pair of charging chambers located adjacent an opposite end of the combustion chambers. One of the charging chambers being for receiving fuel and the other chamber being for receiving an oxidizer. Also contained within said housing are a pair of piston valve means, each valve means being located intermediate one of said charging members and said combustion chamber. One of the valve means provides for the injection of a fuel into the combustion zone and the other of the valve means provides for the injection of an oxidizer into the combustion zone. The valve means are angularly disposed with respect to one another and a central axis through the combustion chamber.

Each of the valve means includes a hollow valve body slideably mounted within the housing, the valve body having fluid passageways therein to provide fluid communication between one of the charging chambers and the combustion chamber. Each valve body has an end adjacent the combustion chamber defining a differential area piston. A valve stop is located within the hollow body for controlling the flow of fluid from the charging chamber through the passageways in said hollow body to the combustion chamber. A biasing means is provided for resiliently urging the valve stop to a closed position to prohibit fluid flow from the charging chamber through the valve body to the combustion chamber. The engine assembly further includes an actuation means for overcoming the biasing means and moving the valve stop to a position which permits fluid flow from the charging chamber through the passageways in the valve body to the combustion chamber. The engine assembly also includes means for introducing an oxidizer to one of the charging chambers and means for introducing a fuel to the other of the charging chambers.

It is an object of the invention to provide a rocket engine assembly suitable for guidance or stabilization of a kinetic energy missile.

It is another object of the invention to provide a rocket engine assembly which is readily scalable to a small size.

It is still another object of the invention to provide a compact rocket engine assembly which can utilize a propellant feed pressure substantially less than the combustion chamber operating pressure.

These and other objects of the invention will be more readily apparent from the following description of the drawings and preferred embodiment of the invention.

BRIEF DESCRIPTION OF THE DRAWINGS

FIG. 1 is a perspective view of a rocket engine assembly constructed in accordance with the present invention; and FIGS. 2a and 2b are cross-sectional views of the rocket engine assembly taken along the lines 2—2 showing the valve means at the beginning and end respectively of a firing pulse.

DETAILED DESCRIPTION OF THE INVENTION

Referring to FIG. 1, therein is shown a particularly preferred embodiment of the rocket engine assembly 10 of the present invention. It is a particular advantage of rocket engine assembly 10 that it may be fabricated in a small compact size. For example, in accordance with the following teaching of the invention, it is possible to build such an engine which will have a length of less than 2 inches and which will produce a thrust of approximately 13 lbs.

Engine assembly 10 includes an outer housing 12 having an outlet end 14 for discharge of hot combustion gases and an injection end 16. Injection end 16 contains the propellant valves which will be described in more detail later and further includes inlet means 18 and 20 for the introduction of propellants such as an oxidizer and a fuel. There also is provided a pair of inlets 22 for the introduction of a pressurized fluid, typically a gas, for actuating the propellant valves and initiating a combustion pulse.

The details of the invention are best seen in FIGS. 2a and 2b which are cross-sectional views showing the engine assembly just prior to initiation of a combustion pulse and at the end of a combustion pulse, respectively. As seen in FIGS. 2a and 2b the exhaust end 14 of housing 12 contains a combustion chamber 24 which is defined by a liner 26. Liner 26 will typically be formed from a material which is capable of withstanding the high temperature of the hot combustion gases such as a quartz phenolic. At the exhaust end of combustion chamber 24 there is provided an insert 28 which defines a converging/diverging nozzle to accelerate the hot gases produced and impart reactive forces to rocket engine assembly 10. Typically insert 28 is formed from a carbide, such as SiC to withstand the temperature and errosive effects of the high velocity hot gases.

Adjacent the opposite end of combustion chamber 24 and located within injector end 16 of housing 12 there are provided two substantially indentical propellant valve assemblies 30 and 32. Each of valve assemblies 30 and 32 includes a hollow valve body assembly 34 terminating at one end adjacent combustion chamber 24 in a differential area piston 36. The piston will have a larger surface area facing the combustion chamber than that facing a charging chamber to be described later. Generally the area facing the charging chamber will be from about 1.5 to 2.5 times that facing the charging chamber. Each of valve bodies 34 has an opposite end 38 provided with a closure member 40. Located within hollow valve body assembly 34 is an elongated, axially moveable valve stop member 42 which is provided at one end with a valve stop portion 44 and at the opposite with a piston portion 46. Located intermediate piston portion 46 and closure member 40, and confined within hollow valve body 34 is a coil spring 48.

Each of inlet means 18 and 20 includes an attachment member 50 which is affixed to a portion of housing 12 and confines a ball member 52 and spring 54 whose function will be described later.

Referring now to FIG. 2a in particular, therein is depicted the condition of the rocket engine assembly prior to initiating a firing pulse. Propellants are supplied to inlet means 18 and 20, for example, a fuel to 18 and an oxidizer to 20. The propellants preferably are hypergolic and will ignite spontaneously upon injection into combustion chamber 24. The propellants are introduced under sufficient pressure to overcome spring 54 such that they flow past ball 52 into a charging chamber 58. From charging chamber 58, the propellants flow through an opening 60 in valve body assembly 34 and into a cavity 62 surrouding the valve stop portion 44 of valve stop member 42. Propellant flow from cavity 62 is prevented by valve stop portion 44 and a seal member 64. As illustrated, charging chamber 58 also is provided with a pair of axially, spaced-apart seal members 66 and 68. Typically, each of the seal members will comprise an O ring seal.

To initiate a combustion pulse, a pressurized fluid, typically a gas, is introduced through inlet 22 where it flows through a passage 70 to exert pressure on piston portion 46 of valve stp member 42. The fluid is introduced under sufficient pressure to overcome the biasing effect of coil spring 48 and force valve stop member 42 away from combustion chamber 24 whereby the propellants in charging chamber 58 and cavity 62 flow through an injection port 72 located in differential area piston 36.

Injection ports 72 are angled such that the propellants impinge upon one another in combustion chamber 24, typically, at an angle $\alpha$ of about 90°. Ignition of the propellants creates pressure within combustion chamber 24 forcing valve assemblies 30 and 32 rearwardly increasing the pressure of the propellants contained in charging cavity 58. Since the surface area of differential area piston 36 facing the combustion chamber is substantially greater than that facing the charging chamber, the pressure within the charging chamber will be substantially greater than the pressure in the combustion chamber. The burning of the propellants will accelerate the rearward movement of differential area piston 36 and thus continue the flow of oxidizer and fuel until the rearward limit of movement is reached. As will be seen in FIGS. 2a and 2b the axial movement or stroke of valve assemblies 30 and 32 is limited by engagement of a flange portion 74 and 76 of valve body assembly 34 with abutment portions 78 and 80 of injector end 16 of housing 12.

When that limit is reached, propellants will no longer be forced to flow into combustion chamber 24, as a result, the combustion will cease. Further, as valve assemblies 30 and 32 move rearwardly, the pneumatic or fluid pressure acting on piston portion 46 will be vented through opening 70 in housing 12 thus permitting spring 48 to move valve stop member 42 forwardly sealing off injection passages 72. Upon cessation of combustion, propellants may once again be delivered to charging member 58 to drive valve body assembly forward in preparation for another firing pulse.

Numerous variations and modifications to the invention may be made without departing from the scope of the invention. Accordingly, it should be clearly understood that the form of the present invention described above and shown in the accompanying drawing, are illustrative only and are not intended to limit its scope.

What is claimed is:

1. A compact pulse rocket engine assembly comprising;

an elongated substantially cylindrical housing containing an elongated axially extending combustion chamber;

a nozzle means located within said housing in fluid communication with an adjacent to an end of said combustion chamber;

a pair of axially extending charging chambers located within said housing adjacent an opposite end of said combustion chamber, one of said chambers for receiving a fuel and the other of said chambers for receiving an oxidizer, each of said charging chambers being angularly disposed with respect to one another and an axis extending through said combustion chamber;

two valve means located within said housing, one of said valve means extending through one of said charging chambers to said combustion chamber and providing for the injection of a fuel into said combustion chamber and the other of said valve means extending through the other of said charging chambers to said combustion chamber and providing for the injection of an oxidizer into said combustion chamber, each of said valve means including (a) a hollow valve body slideably mounted within said housing, said valve body having a fluid passageway therein providing the sole means for fluid communication between one of said charging chambers and said combustion chamber, each of said valve bodies and passageways providing for impingement of fuel and oxidizer upon one another at a fixed, centrally located point on the axis of said combustion chamber, said valve body having an end adjacent said combustion chamber defining a differential area piston; (b) a valve stop located within said hollow body for controlling the flow of fuid from said charging cavity through said passageway in said hollow body to said combustion chamber; (c) biasing means for resiliently urging said valve stop to a closed position for prohibiting fluid flow from said charging chamber through said valve body to said combustion chamber; and (d) means for limiting axial movement of each of said valve means;

actuation means for overcoming said biasing means and moving said valve stop to a position to permit fluid flow from said charging chamber through said passageways to said combustion chamber;

means for introducing an oxidizer into one of said charging chambers, and;

means for introducing a fuel into the other of said charging chambers.

2. The rocket engine assembly of claim 1 wherein said biasing means comprises a spring.

3. The rocket engine assembly of claim 2 wherein said means for introducing a fuel and said means for introducing an oxidizer each include a check valve located adjacent said charging chambers for the admission of propellant therein while prohibiting reverse flow therefrom.

4. The rocket engine assembly of claim 1 wherein said means for introducing fuel and oxidizer provides for their introduction under pressure.

5. The rocket engine assembly of claim 1 wherein said valve stop includes a piston member adjacent an end opposite said combustion chamber, and wherein said actuation means includes means for introducing a pressurized fluid into contact with said piston member for overcoming said biasing means.

6. The rocket engine assembly of claim 1 wherein said differential area piston has surface areas facing both the combustion chamber and the charging chamber, and the surface area facing the combustion chamber is substantially greater than the surface area facing the charging chamber.

7. The rocket engine assembly of claim 1 wherein said housing includes at least two axially spaced-apart, inwardly projecting abutments for limiting axial movement of the valve body of each of said valve means.

8. The rocket engine assembly of claim 1 wherein said valve means and charging chambers are disposed at an angle of 90° with respect to one another.

* * * * *